W. N. FORT & R. R. MOORE.
Pill-Machine.
No. 212,453.  Patented Feb. 18, 1879.
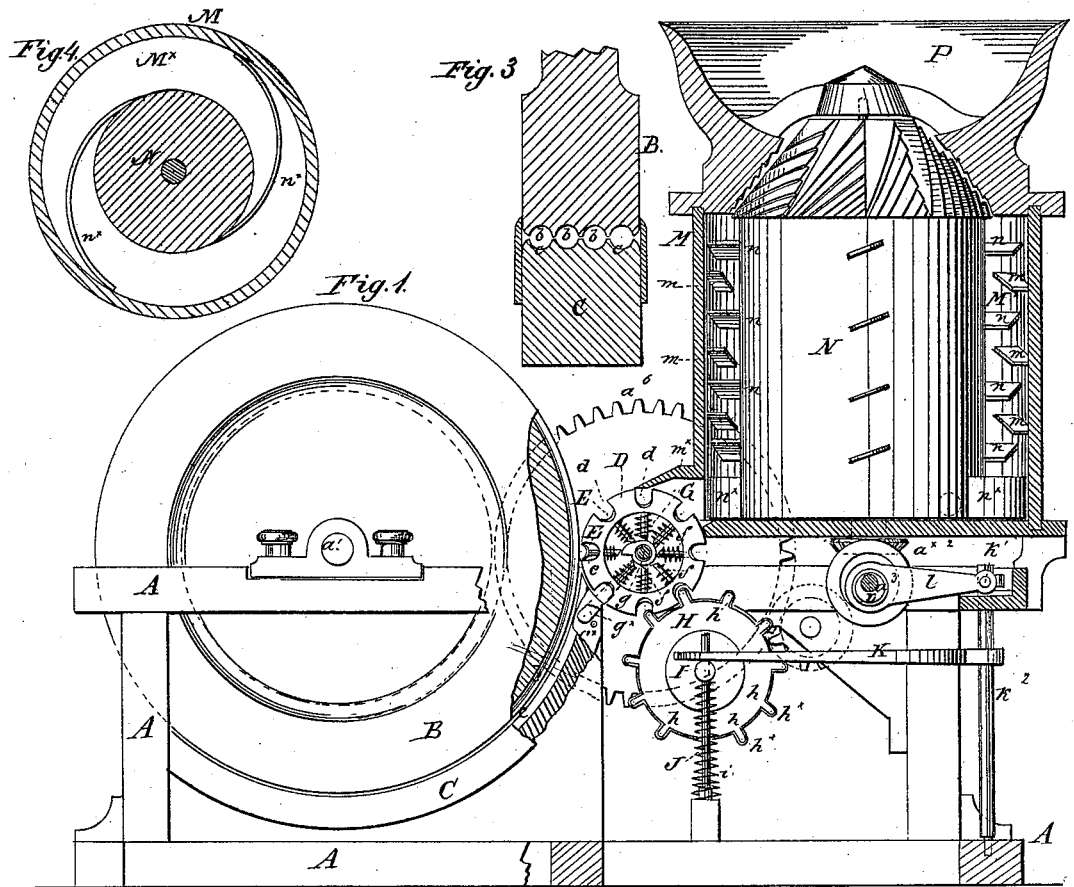
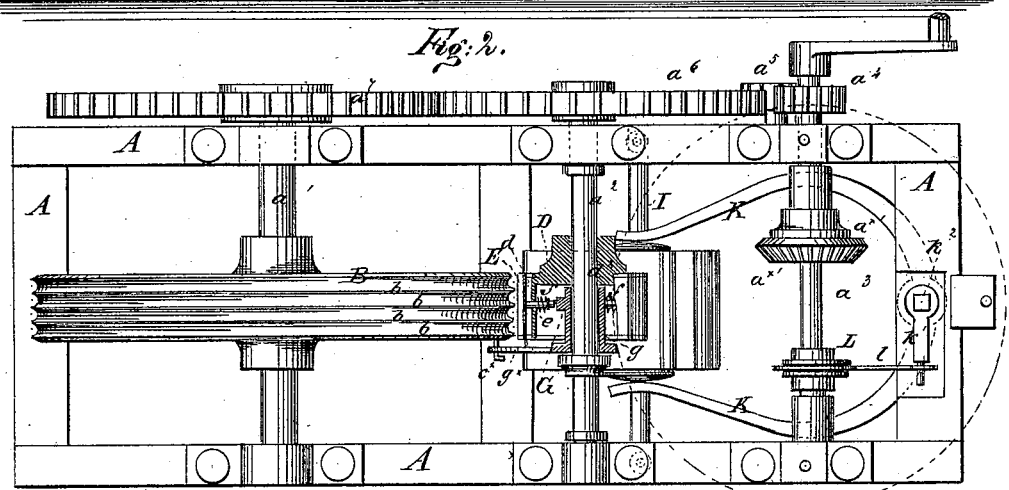
WITNESSES:
INVENTOR:
W. N. Fort
R. R. Moore
BY
ATTORNEYS.

UNITED STATES PATENT OFFICE.

WILSON N. FORT AND ROBERT R. MOORE, OF LEWISVILLE, ARKANSAS.

IMPROVEMENT IN PILL-MACHINES.

Specification forming part of Letters Patent No. 212,453, dated February 18, 1879; application filed May 11, 1878.

*To all whom it may concern:*

Be it known that we, WILSON N. FORT and ROBERT R. MOORE, of Lewisville, in the county of La Fayette and State of Arkansas, have invented a new and useful Improvement in Pill-Machines, of which the following is a specification:

Our invention relates to certain improvements whereby a machine is produced which is adapted to the making of a large number of pills of the same kind, and from ingredients of the same character.

The invention consists in a transversely-grooved feed-wheel combined with a grooved pill wheel and trough; in a clearing and powdering wheel, having projection, in combination with the feed-wheel; in a shaft, rods, and springs combined with the powdering-wheel; in a shaft, eccentric, and rod, an arm, vertical rock-shaft, and forked arm, in combination with the powdering-wheel; in the casing provided with blades and spout, and the cylinder provided with blades, in combination with feed-wheel, all as hereinafter described.

The manner of carrying out our invention will be more fully understood on reference to the accompanying drawings, in which—

Figure 1 is a side view, partly in section, of a machine embodying our improvements, showing the machine arranged for making a large number of pills of the same kind. Fig. 2 is a top view of the same with a portion removed. Fig. 3 is a vertical, and Fig. 4 a horizontal, section.

Similar letters of reference indicate corresponding parts.

The working parts of the apparatus are supported by a frame, A, which may be of any suitable construction.

In the sides of the frame is journaled a horizontal shaft, $a^1$, which carries a wheel, B, having a series of semi-cylindrical grooves, $b$, extending entirely around its face. Beneath this wheel is a trough, C, the face or inner surface of which forms an arc of a circle corresponding with the face of the wheel B, while its exterior may be of any suitable shape, and it may be supported in any suitable manner, so that the wheel B, as it revolves, will pass in contact with and be partly embraced by it.

The face of this trough is provided with semi-cylindrical grooves $c$, corresponding in number and position with the grooves $b$ in the wheel B, so that when the two surfaces are in position together the junction of the two series of grooves $b$ $c$ will present a cylindrical form in cross-section, as shown in Fig. 3. A scraper may be provided for clearing these grooves as the wheel revolves.

The feed-wheel D is carried by a shaft, $a^2$, journaled in the frame A, parallel with the shaft $a^1$, and at such distance therefrom as to place the face of the feed-wheel D nearly in contact with the face of the pill-wheel B.

The face of the feed-wheel D is provided with semi-cylindrical grooves $d$, lying transversely thereof, and at right angles to the grooves $b$ in the pill-wheel.

In each of the grooves $d$ is a follower, E, corresponding in form with the groove, and provided with a stem, $e$, extending inward toward the shaft $a^1$ in a radial direction.

The wheel D is preferably made of metal, and is here shown as in the form of a ring or band, attached on one side to a hub, $d^x$, secured to the shaft $a^2$. The stem $e$ of each follower is surrounded by a spiral spring, $f$, one end of which bears against a shoulder on the stem, and the other end against the inner surface of the band or feed wheel, with a tendency to keep the follower E lying closely in the groove $d$.

The shaft $a^2$ works freely in a sleeve, $g$, on which is a cam, G, of quadrantal or approximate form in its cross-section. Any suitable means may be employed for placing and holding the sleeve and cam in proper position.

As here shown, the sleeve is provided with an arm, $g^x$, which engages with a pin, $c^x$, projecting from the trough C, by which means the sleeve is prevented from turning with the shaft, and the cam is held in position on the side nearest the pill-wheel B.

The device for cleaning and powdering the feed-wheel consists of a wheel, H, having on its face a series of tongues, $h$, for engagement with the grooves $d$ and followers E of the feed-wheel.

The wheel H turns freely on a horizontal shaft, I, through the ends of which pass two rods, J J, extending between the lower and upper rails of the frame A, and surrounded by spiral springs $i\ i$, upon the upper ends of which the ends of the shaft I rest. By this arrangement of parts the cleaning-wheel is held snugly against the feed-wheel, and is allowed to reciprocate longitudinally on its shaft during its rotation, as hereinafter particularly described.

The face of the cleaning-wheel is covered with a layer, $h^\times$, of plush, velvet, or other suitable material. Above it may be placed a vessel for supplying it with powder; and below it a receptacle for the powder which may drop from it.

In the frame A, parallel with the shafts $a^1$ $a^2$, is journaled a horizontal shaft, $a^3$, which may be the main driving-shaft. This shaft carries an eccentric, L, which operates an eccentric-rod, $l$, the free end of which engages with an arm, $k^1$, extending horizontally from a vertical rock-shaft, $k^2$, having its bearings in the upper and lower end pieces of the frame A. The shaft $k^2$ carries a forked arm, K, the two branches of which bear, respectively, against the two sides of the cleaning-wheel H, immediately above its shaft, and as near its center as possible.

The parts constructed and arranged as above described operate as follows: Power being applied to the shaft $a^3$ motion is communicated to the feed-wheel and pill-wheel by means of gearing $a^4\ a^5\ a^6\ a^7$.

The mass to be made into pills is supplied to the feed-wheel D, which delivers it to the pill-wheel B. As each groove $d$ arrives opposite the periphery of the pill-wheel the follower E in such groove is forced outward by the engagement of its stem $e$ with the cam G, (see Figs. 1 and 2,) so as to press the contents of said groove into the grooves $b$ of the pill-wheel. The portion thus pressed out by each follower is cut into a number of pieces corresponding with the number of grooves in the face of the pill-wheel, and said pieces remain in said grooves, and are carried downward into the grooves $c$ of the trough C, where they receive a rolling motion, which forms them into pills.

As soon as the follower E has delivered the mass to the pill-wheel the stem $e$ slips clear of the point of the cam G, and the spring $f$ returns the follower to its place in the bottom of the groove. As the revolution of the feed-wheel continues each groove engages with one of the tongues $h$ of the wheel H, and imparts rotary motion to said wheel, and at the same time the forked arm K is actuated by the rock-shaft $k^2$ and its arm $k^1$ and the eccentric L and its rod $l$, so as to impart a reciprocating motion to said wheel H longitudinally on its shaft I, and thus clear the follower and groove of any of the mass which may have adhered, and apply powder thereto previous to receiving another quantity of the mass to be fed to the pill-wheel.

We will now describe the means we employ for grinding, mixing, and supplying the mass when it is desired to make a large number of pills of the same kind.

Referring to Fig. 1, M represents a cylindrical casing, within which is an upright cylinder, N, having at its lower end a shaft or gudgeon, which extends through the bottom of the casing M and carries a bevel-gear, $a^{\times 2}$, meshing into a bevel-gear, $a^{\times 1}$, carried by the driving-shaft $a^3$. The upper end of the cylinder N is conical, and is dressed for grinding.

On the top of the casing rests a hopper, P, having a portion of its inner surface dressed for grinding and corresponding in form with the conical grinding-surface of the cylinder N.

The hopper and grinding-surfaces may be of any suitable description.

Between the surface of the cylinder N and the inner surface of the casing M is sufficient space for the passage of the mass to be made into pills; and in this space $M^\times$ are a number of stationary blades, $m$, projecting from the casing, and similar shaped blades $n$ projecting from and carried by the cylinder. These blades are inclined downward and arranged spirally in the direction of rotation of the cylinder N.

The lower end of the cylinder carries one or more elastic metallic wings, $n^\times$, each of which has its inner end secured to said cylinder, and extends outward in curved form, so that its outer end bears against the inner surface of the casing, as shown in Fig. 4.

The width of each wing is about equal to or greater than that of the mouth of the spout $m^\times$ of the casing M, which spout is here shown as located just over the feed-wheel D, so as to cover one or more of the grooves $d$.

When this apparatus is used the mass to be ground, mixed, and made into pills is placed in the hopper P, from whence it passes to the grinding-surfaces, where it is ground; thence to the mixing-chamber $M^\times$, where the blades $m\ n$ cut and thoroughly mix it and convey it to the bottom of said mixing-chamber, and from thence it is forced by the wings or scrapers $n^\times$ and pressed outward through the spout $m^\times$ and delivered to the feed-wheel D.

We are aware that it is not new to combine a grooved wheel and correspondingly-grooved trough for rolling pills, a grooved feed-wheel and spring-followers, or a cam with followers for an analogous use.

Having thus described our invention, we claim as new and desire to secure by Letters Patent—

1. The transversely-grooved feed-wheel D, in combination with the pill-wheel B and trough C, substantially as and for the purpose shown and described.

2. The cleaning and powdering wheel H, having projections $h$, in combination with the feed-wheel D, substantially as and for the purpose herein described.

3. The shaft I, rods J J, and springs $i\ i$, arranged as shown and described, in combination with the wheel H, substantially as and for the purpose specified.

4. The combination of the shaft $a^3$, the eccentric L, and its rod $l$, the arm $k^1$, vertical rock-shaft $k^2$, and forked arm K with the wheel H, substantially as and for the purpose shown and described.

5. The casing M, provided with the blades $m$ and spout $m^\times$, and the cylinder N, provided with the blades $n$ and wings $n^\times$, in combination with the feed-wheel D, substantially as and for the purpose shown and described.

WILSON NELMS FORT.
     ROBERT REA MOORE.

Witnesses:
 ALEX. BYRNE,
 J. B. YOUNG.